United States Patent [19]
McIntosh

[11] Patent Number: 5,590,054
[45] Date of Patent: Dec. 31, 1996

[54] VARIABLE-DENSITY METHOD FOR MULTI-LAYER INSULATION

[75] Inventor: Glen E. McIntosh, Boulder, Colo.

[73] Assignee: Cryogenic Technical Services, Inc., Boulder, Colo.

[21] Appl. No.: 449,662

[22] Filed: May 24, 1995

Related U.S. Application Data

[62] Division of Ser. No. 220,995, Apr. 1, 1994, abandoned.

[51] Int. Cl.⁶ .......................... A47J 41/00; B65D 23/02; B65D 90/08
[52] U.S. Cl. .................. 364/505; 215/12.1; 215/12.2; 220/415
[58] Field of Search .................... 364/505; 215/12.1, 215/12.2; 220/415, 420, 421, 425, 426, 466

[56] References Cited

U.S. PATENT DOCUMENTS

| | | | |
|---|---|---|---|
| 3,199,715 | 8/1965 | Paivanas | 220/423 |
| 3,409,061 | 11/1968 | Struble, Jr. | 206/524.1 |
| 3,695,483 | 10/1972 | Pogorski | 220/9 C |
| 4,037,751 | 7/1977 | Miller et al. | 220/9 R |
| 4,044,911 | 8/1977 | Hargreaves | 220/9 LG |
| 4,055,268 | 10/1977 | Barthel | 220/421 |
| 4,154,363 | 5/1979 | Barthel | 220/421 |
| 4,345,204 | 3/1982 | Ludwig | 454/255 |
| 4,476,185 | 10/1984 | Spittle | 428/490 |
| 4,713,275 | 12/1987 | Riccitiello et al. | 428/76 |
| 4,781,777 | 11/1988 | Pugnale et al. | 156/187 |

OTHER PUBLICATIONS

"Layer by Layer MLI Calculation Using a Separated Mode Equation," Glen E. McIntosh, Cryogenic Technical Services, Inc., Boulder, Colorado, Paper Presented Jul. 15, 1993, Albuquerque, New Mexico.

*Primary Examiner*—Emanuel T. Voeltz
*Assistant Examiner*—Hien Vo
*Attorney, Agent, or Firm*—Millen, White, Zelano, & Branigan, P.C.

[57] ABSTRACT

A variable-density MLI-insulation employs unbonded, glass paper to separate radiation barriers. A layer-by-layer heat balance is conducted to determine the thickness of the various separation layers which vary from relatively thin at the warm wall to relatively thick at the cold wall.

5 Claims, 2 Drawing Sheets

VARIABLE-DENSITY METHOD FOR MULTI-LAYER INSULATION

The instant application is a division of U.S. Ser. No. 08/220,995 filed Apr. 1, 1994, abandoned.

BACKGROUND OF THE INVENTION

The invention described herein may be manufactured, used, and licensed by or for the government for governmental purposes without the payment of any royalty thereon.

This invention relates to an improved multi-layer insulation for extreme-temperature apparatus. In this respect, the invention will be described primarily in connection with a Dewar vessel, but it will be understood that the invention applies to other extreme-temperature devices such as superconducting magnet enclosures, cryogenic piping and the like. Generally speaking, such apparatus includes an inner container, an outer container, an evacuated space therebetween, and radiation barriers located in the vacuum space.

Structures with which the invention finds particular utility experience three types of heat transfer, namely, radiation, gas conduction (convection), and solid conduction. For a given Dewar vessel, for example, it has been customary to reduce radiation heat transfer by installing a plurality of radiation barriers in the vacuum space. Hence, the description "multi-layer insulation" (MLI) has been applied. Gas conduction is reduced by evacuation, and solid conduction has been reduced by various mechanical means.

For constant surface emissivities in a reasonably good vacuum ($10^{-5}$ Torr or lower), heat leak generally decreases with $1/N$ where N is the number of reflective shields between the vessel's warm and cold surfaces. To obtain adequate performance, however, it is necessary that the reflective shields be prevented from touching each other. Otherwise, thermal shorts occur. Hence, separator materials are required to keep the multiple radiation shields from touching. Otherwise, the separator materials only add to the vessel's heat transfer rate. In this respect, a typical installation might include one or more sheets of separator material between reflective shields of thin aluminum foil or double-aluminized Mylar (DAM).

Often, "bumper strips" are installed between the reflective layers. These bumper strips might cover from 10-15% of the insulation area. Such bumper strips improve performance by increasing spacing without a proportional increase of solid conduction as compared to simply adding more separator sheets, but they are not as efficient as the industry would like. Hence, it is an object of this invention to provide improved separating structures which will retain the benefits of the customary reflective barriers while reducing the solid conduction contributed by the separator materials and reducing the overall heat transfer between a Dewar vessel's inner and outer walls.

SUMMARY

A variable-density MLI-insulation includes the usual evacuated chamber where separating members are located between adjacent radiation barriers. Rather than the customary, uniformly spaced separator layers, however, the thickness of the separators is determined in accordance with a layer-by-layer heat balance so that the separator thickness increases toward the cold wall to the point where the separator thickness at the cold wall is three or four times the thickness at the warm wall.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating principles of the invention.

DESCRIPTION OF PREFERRED EMBODIMENTS

Figure 1:
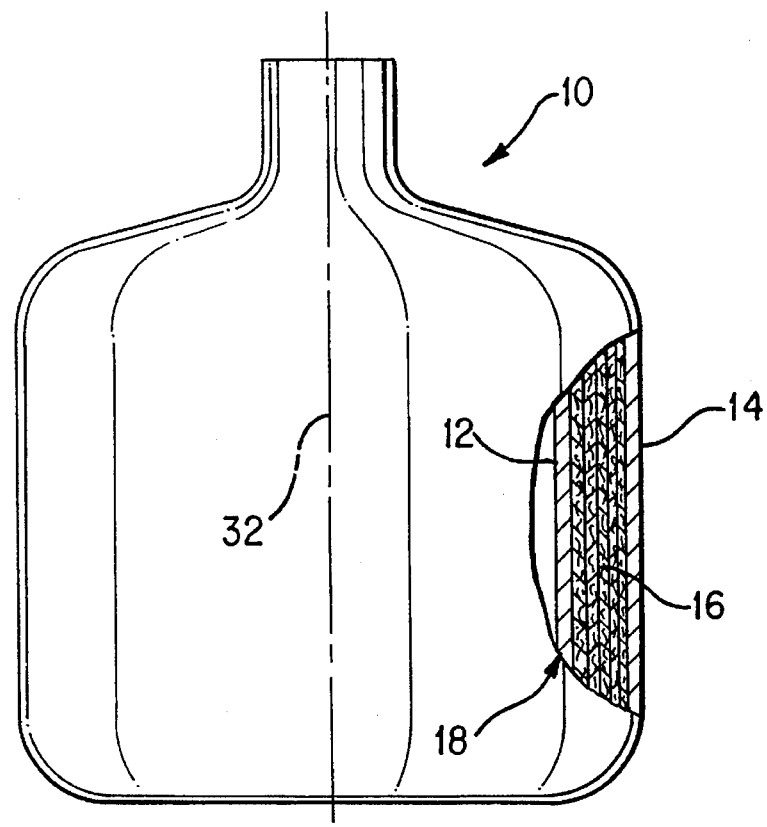
FIG. 1 is a schematic, side view of a Dewar vessel having one of its walls partially broken away.

In an effort further to reduce heat leak between the inner and outer walls of Dewar vessels, the typical structure of multi-layer insulation and heat transfer between each reflective layer have been analyzed and the various contributions of radiation and solid and gas conduction have been evaluated to develop equations suitable for a heat balance on each reflective layer. A paper setting forth those equations entitled "Layer-by-Layer MLI Calculation Using a Separated-Mode Equation" was delivered on Jul. 15, 1993 at a meeting of the Cryogenic Engineering Conference in Albuquerque, N. Mex. That paper will be published in "Advances in Cryogenic Engineering" Vol. 39, Plenum Press, New York, 1994; and, is incorporated in its entirety herein by reference.

Thermal radiation heat transfer is defined by the Stephan-Boltzmann law that heat transfer between parallel surfaces is a function of the emissivities of the surfaces and the warm absolute temperature taken to the fourth power minus the cold absolute temperature taken to the fourth power. Because of the powerful effect of raising the temperatures to the fourth power, the impact of radiation between radiation barriers near a Dewar vessel's cold wall drops dramatically from the impact of radiation between radiation barriers near the vessel's warm wall. Correspondingly, the temperature difference between reflective barriers increases as the cold wall is approached.

Insofar as gas conduction is concerned, contemporary structures such as Dewar vessels employ vacuum levels of $10^{-5}$ Torr and lower where gas conduction is essentially linear. Hence, gas conduction will not be further discussed.

Aside from heat leak due to supports and piping, a structure's solid-conduction through MLI separator materials is a major mode of heat leak. The equations set forth below indicate that this solid-conduction ranges from about one-tenth of the radiation heat transfer at ambient temperatures to as much as ten times the radiation heat transfer near liquid helium temperatures of 4.2 degrees K. Accordingly, although an MLI-insulated Dewar's solid conduction decreases somewhat as temperatures decrease near the vessel's cold wall, its solid conduction is far more significant than at its warm wall. This invention, therefore, focuses primarily upon the reduction of solid-conduction heat leak near a Dewar's cold wall.

The above-cited paper separately treats the three parallel modes of heat transfer and then combines them into an equation to be used in layer-by-layer MLI calculations so that:

$$k_t = k_r + k_g + k_s \tag{1}$$

Where $k_t$ is the "thermal conductivity" value which represents the three modes of heat transfer through the MLI;

$k_r$ is the thermal conductivity value due to radiation;

$k_g$ is the thermal conductivity value due to gas conduction; and $k_s$ is the thermal conductivity value due to solid conduction.

$$k_r = \sigma \left\{ \frac{[\epsilon_w \cdot \epsilon_c]}{\epsilon_w + \epsilon_c - \epsilon_w \cdot \epsilon_c} \cdot [T_w^2 + T_c^2] \cdot (T_w + T_c) - C \cdot [(T_w + T_c)/2]^3 \right\} \tag{2}$$

Where, $\sigma$=Stephan-Boltzmann constant=5.675E(−8) W/m²·K⁴

$T_w$=temperature of the warm surface, K $T_c$=temperature of the cold surface, K $\epsilon_w$ & $\epsilon_c$ are the warm and cold surface emissivities C=a factor of the separated material and density Suitable such factors are:

| | |
|---|---|
| Dacron polyester heat felted fiber, | C = 6.89 × 10⁻⁶ |
| Glass paper sheet spacer, | C = 1.44 × 10⁻⁹ |

Other similar factors for other materials are well-known in literature and will be apparent to persons ordinarily skilled in the art.

Where $\epsilon_w = \epsilon_c = \epsilon$:

$$k_r = \sigma\{[\epsilon/(2-\epsilon)] \cdot [T_w^2 + T_c^2] \cdot (T_w + T_c) - C \cdot [(T_w + T_c)/2]^3\} \tag{2a}$$

$$k_g = C_1 \cdot P \cdot \alpha \tag{3}$$

is the corruccini equation where, $k_g$=gas conduction, W/m²·K

P=gas pressure, Pa $\alpha$=accommodation coefficient $C_1 = [(\gamma+1)/(\gamma-1)] \cdot [R/8\pi \cdot M \cdot T]^{1/2}$ Where, $\gamma = C_p/C_v$ R=gas constant, 8.31441 J/mol·K M=molecular wt of gas, kg/mol T=temperature of vacuum gauge, normally 300K For air, $C_1$=1.1666 and for helium it is 2.0998. The accommodation coefficient is different for each interstitial gas and varies with temperature. Suitable such accommodation coefficients are given in publications such as R. J. Corruccini, "Gaseous Heat Conduction at Low Pressures and Temperatures," Vacuum, Vol. 7 & 8, (1959) which is incorporated herein by reference in its entirety. From Table II of Corruccini's Accommodation Coefficients (pp. 19–29), for example:

| Temperature K. | Helium | Hydrogen | Air |
|---|---|---|---|
| 300 | 0.3 | 0.3 | 0.8–0.9 |
| 80 | .4 | .5 | I ≈ 1 |
| 20 | .6 | I | |
| 4.2 | I | | |

Other similar factors are well-known in literature and will be apparent to persons ordinarily skilled in the art. Conventional curve fit equations and techniques can also be used to set up $\alpha$ for MLI calculations. In this respect, see J. B. Scarborough, "Numerical Mathematical Analysis," The Johns Hopkins Press, Baltimore (1930) which is also incorporated herein by reference in its entirety. For temperatures below 80K with helium as the interstitial gas, for example, the following curve fit equation was used for the Accommodation Coefficient:

$\alpha = 0.4 + 0.6(80 - T_{AVG.})/80$ $$k_s = C_2 \cdot f \cdot k/\Delta X \tag{4}$$

Where, $k_s$=the solid conductivity per unit thickness, W/m²·K $C_2$=an empirical constant Suitable empirical constants are, for example:

| | |
|---|---|
| Heat bonded Dacron fibers | $C_2$ = 0.008 |
| Glass fiber paper | $C_2$ = 0.002 |

Other suitable such empirical constants will be apparent to persons ordinarily skilled in the art; and, moreover, can be independently determined by conventional experimental techniques.

f=relative density of the separator compared to solid material k=separator material thermal conductivity, W/m·K $\Delta X$=actual thickness of separator between reflectors, m Curve fit equations have been written to express data for glass paper as a function of temperature. Glass paper data is approximated with reasonable accuracy by the following equation:

$$k_s = (0.002 \cdot f/\Delta X) \cdot [0.03 + 0.00585 \cdot T - 0.0865 \cdot (T/100)^2] \tag{5}$$

Other curve/fit equations for other materials can be similarly generated by conventional curve-fit techniques such as those described in the previously incorporated Scarborough reference.

In accordance with principles of the invention, A Dewar's separator materials are tailored to match its radiation-temperature profile so that radiation barriers near the cold wall are spaced further apart; and/or, so that the circumferential distance between separators increases as the separators are located closer to the vessel's colder wall. Preferred embodiments of the invention also contemplate the formation of separators into a matrix or lattice wherein separators that are oriented generally circumferentially are thicker than those that are oriented in a more axial direction. In some instances, however, it may be desirable for the axially-oriented lattice members to be as thick as the circumferential members, but not thicker. Further, where circumferential separators crossover axial separators they are simply laid over each other (and possibly tacked), but twisting is avoided to avoid compression which tends to create small thermal shorts.

The above-described separating lattices can be automatically fabricated by a weaving device having a row of warp dispensing rolls which can be alternately raised and lowered to allow passage of a mechanical shuttle for insertion of the weft material. The weft material is dispensed from a roll transverse to the warp direction.

The warp dispensing rolls are connected to a mechanism which simultaneously raises and lowers adjacent rolls to separate the warp strips for weft insertion. Movement of each warp dispensing roll is reversed for each weft insertion in order to produce a woven structure.

The above-described structure accomplishes two major functions. Firstly, at the warm wall, it concentrates on radiation where radiation is most significant; and, at the cold wall it concentrates on solid conduction where solid conduction is most significant. It does this by increasing the thickness of the separating layers nearer to the cold wall. Secondly, by using a matrix-form of separating materials of unbonded fibers, the mass of solid-conduction material between reflective layers is reduced while the crossover intersections of the matrix add to the thickness with little or no addition of mass. In this manner, prototypes have had a separator coverage of only 35% and less, but, where both circumferentially and axially-oriented matrix elements are of the same thickness, the separator mass is only about ⅙ that of two sheet separators.

FIG. 1 illustrates a cryogenic Dewar vessel 10 having a cold inner wall 12, a warm outer wall 14, and multi-layer insulation 16 in a vacuum chamber (between the walls 12 and 14) that is evacuated to at least about $10^{-5}$ Torr.

Figure 2:
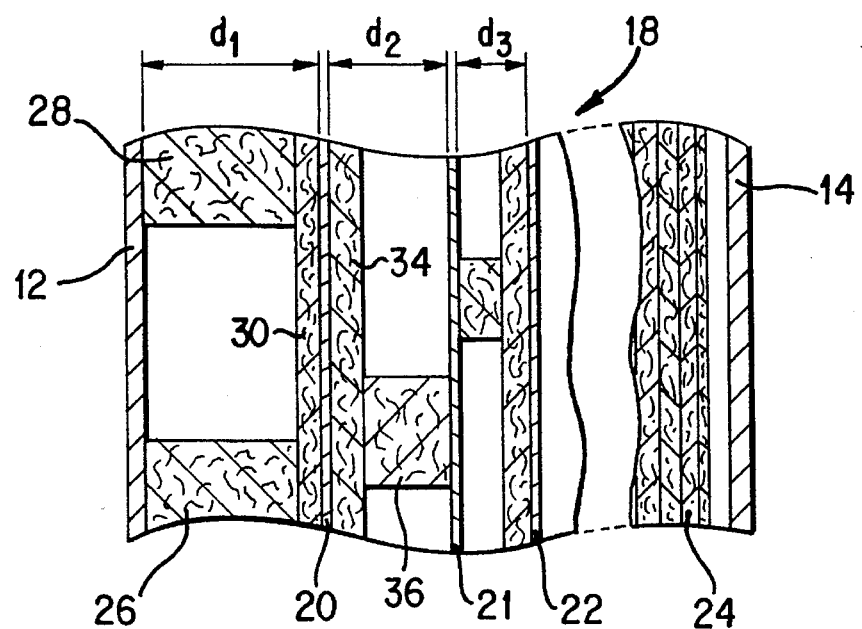
FIG. 2 is a greatly enlarged schematic view of the broken-away portion of FIG. 1.

FIG. 2 is an enlarged view of the broken-away portion 18 of FIG. 1 showing the MLI between the walls 12 and 14 in more detail. In this respect, reflective layers 20, 21, and 22 are spaced apart by decreasing distances $D_1$, $D_2$, and $D_3$ until corresponding radiation barriers 24 closer to the warm, outer wall 14 are separated by smaller distances ($D_n$) as will be discussed in more detail shortly. The entire space between the cold wall 12 and the warm wall 14 is pumped down to create a vacuum in a conventional manner, but absence of separator sheets and the additional spacing provided by distances $D_1$, $D_2$, and $D_3$ permits a more efficient pump-down which results in a better and more efficient vacuum between the vessel's warm and cold walls.

The distance $D_1$ between the cold wall 12 and the radiation barrier 20 is maintained by a lattice-work of separators comprised of generally circumferential members such as 26 and 28 and members such as 30 that are more parallel to the vessel's axis 32. The radiation barrier 21 is similarly separated from the radiation barrier 20 by generally axially oriented separators such as 34 and circumferential separators such as 36. In this manner, all of the radiation barriers are separated from each other by similar separators.

Similar separating lattices are located between the radiation barriers 24, but the separating lattice members between the vessel's outer radiation barriers are thinner than those between the radiation barriers 20 and 21, for example. In this respect, a thick-to-thin ratio of between about 3:1 and 4:1 is contemplated. The spacing between the radiation barriers near the warm outer wall is essentially uniform because, as noted, solid-conduction heat leak near the warm wall is far less significant than radiation heat leak. Conversely, the heat transfer between radiation barriers such as 20 and 21 near the cold surface of the vessel is only a small fraction of the radiation heat transfer between the radiation barriers near the vessel's warm surface 14. Accordingly, fewer radiation barriers are applied near the cold surfaces; and, it is for this reason that the vessel's radiation barriers are spaced further and further apart as they approach the vessel's cold, inner wall 12.

Additionally, solid-conduction heat leak through the separating lattices near the cold wall varies inversely with the thickness of the separators. Because the temperature difference between reflective layers increases as the temperature falls, solid conduction is so much more important near the cold wall than near the warm surface. Therefore, increasing the thickness of the separators is most significant near the cold wall.

Suitable separating materials are silk, glass paper, Dacron and the like. Other conventional separator materials can also be used and made into cut or folded strips. Very loose, fluffy, yarns of Dacron, micro-glass fibers, and silk fibers are presently preferred for the lattice separators of the invention. Silk net, Dacron scrim, polyester scrim, and the like can also be folded to obtain separators having desired thicknesses, but only non-flammable materials (such as glass) are presently permitted in many uses involving fluids such as liquid hydrogen.

It is preferred that the separating materials be of an unbonded material. In this sense, however, "unbonded" includes "spunbonded" material such as polyester and polyolefin materials wherein fibers are heat-fused together so that they stick, but no substantial amounts of other bonding materials are generally employed.

One suitable glass fiber material is comprised of unbonded glass fibers and manufactured by the Lydall Manning Nonwovens Co. in Troy, N.Y. and sold under the "CRYOTHERM" Trademark. In this respect, in one preferred embodiment, the circumferential separating layers 26 and 28 are nominally about 0.045–0.048-inch thick and the axially oriented separating layer 30 is about the same or about 1 gauge thinner so that the distance $D_1$ is no more than about 0.100-inch.

Figure 4:
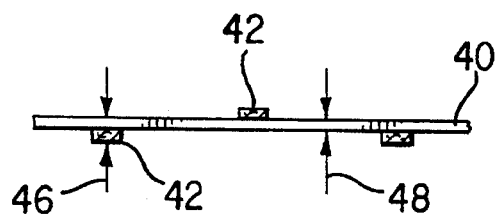
FIG. 4 is a schematic-sectional view taken along the lines 4—4 of FIG. 3.

Preferably, the separating material is woven from such unbonded glass-paper warps 40 and glass-paper wefts 42 to form a lattice comprised of squares 44. The warps correspond to the circumferential separators such as 26, 28, and 36 in FIG. 2 and the wefts correspond to the axially oriented separators 30 and 34 in FIG. 2. In this respect, the dimension 46 in FIG. 4 is preferably no more than about 0.100-inch for the separating lattice between the radiation barrier 20 and the inner wall 12 in FIG. 2 and the dimension 48 in FIG. 4 is preferably between about 0.045 and 0.048-inch (and less) at the cold wall. As the spacing between the radiation barriers decreases toward the warm wall 14, however, the dimension 46 is preferably between about 0.015 and 0.020-inch while the dimension 48 is preferably about 0.0075-inch. The stated thicknesses are nominal because the preferred separating materials such as unbonded glass paper tend to be somewhat fluffy and, therefore, are subject to compression depending upon the tension with which they are applied. Indeed, the preferred glass paper is sold in mass per square meter. One vendor, for example, sells nominal 0.0075–0.0085-inch glass paper as 30 g/m²; and, another vendor sells nominal 0.025-inch paper as 84 g/m².

Figure 3:
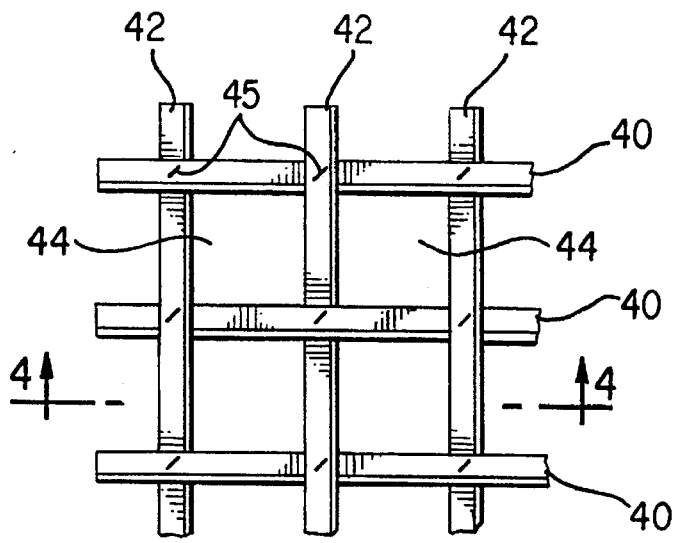
FIG. 3 is a schematic, plan view of a separating-lattice used in the apparatus of FIGS. 1 and 2.
Figure 5:
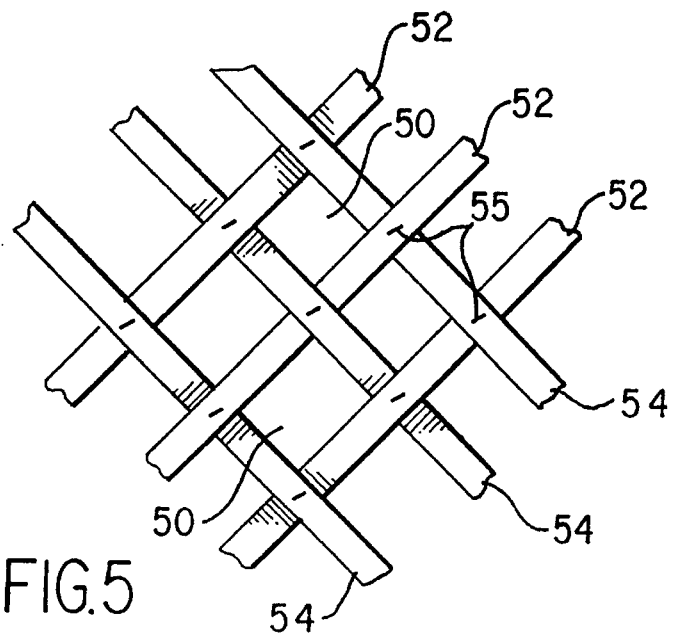
FIG. 5 illustrates an alternate embodiment of the separating lattice of FIG. 3.

Although the lattice has been shown in FIG. 3 as being comprised of squares 44, they can also be comprised of other shapes as diamonds 50 in FIG. 5 wherein the warps 52 are as much as 45 degrees away from being circumferential and the wefts 54 are about 45 degrees away from being parallel to the vessel's axis. Where other parallelograms such as rectangles are employed, it is contemplated that the percentage of coverage would remain the same as for squares, but the circumferentially oriented warp strips would be closer together and the axially-oriented weft strips would be further apart.

The wefts and warps can be tacked at their intersections such as by tacks 45 and 55 which are similar to nylon tacks used to affix clothing tags to clothing. Tacking can also be accomplished by means of small drops of adhesive, such as one of the anaerobic-curing adhesives sold under the "SUPER GLUE" trademark. Similarly, fusion of small ⅛–¼-inch diameter spots can be accomplished by lasers or other heating devices. In this respect, FIGS. 3 and 4 illustrate tacks at each intersection, but tacks, if used at all, can be selectively applied at various intersections to prevent slippage occurring during fabrication and use.

The dimensions of the squares 44 in FIG. 3 are preferably between about 4 and 6 inches on a side (measured from the strip center lines); and, the sides of the diamonds 50 in FIG. 5 can be preferably similarly dimensioned. In the condition described above, where the radiation barriers near the vessel's cold surface are spaced further apart than the radiation barriers near the warm surface, the dimensions of the squares (or diamonds) nearer to the vessel's cold surface can be greater than those near the vessel's warm surface because there is less likelihood (because of the greater radial separation distance) for thermal shorts between the radiation barriers closer to the cold surface.

Conventional bumper strips between continuous separator sheets typically cover about 10%–15% of the MLI area. In the lattice-structure of the instant invention, however, the major areas of solid conduction are at the cross-over points of the wefts and warps. Because the structure of the invention permits larger distances between weft/warp cross-over points nearer to the vessel's cold surface 12, the relatively cold contact areas comprise only about 2.8%–3% of the MLI area. This percentage is not as important, however, as the described techniques's reduction of conduction by a factor in excess of 100 over that of conventional MLI structures. If the sides of the lattice openings are shortened as the warm outer wall is approached, however, the crossover contact area may increase to about 5% or more of the MLI area. Conversely, the increase in the size of the lattice openings and the decrease in contact area as the cool inner surface is approached serve to decrease the solid-conductivity heat leak.

Larger lattice sizes coupled with greater separations between radiation barriers also serve to enhance vacuum pump-down and further improve performance. Similarly, in the case where the circumferential warps are thicker than the wefts, the resulting lattice is not only stronger than if the warps were only as thick as the warps, but the resulting larger spacing between the radiation barriers also assists in vacuum pump-down.

The above-described thermally superior separator, once started, is applied to a cylinder, for example, (or a cylindrical take-up roll) without hand labor.

Alternatively, a relatively conventional weaving-type loom can be employed wherein the warp elements are wound onto a cylinder or take-up roll and a suitable harness is used to lift selected warps to form a shed through which the wefts can be selectively placed. Tacking is preferably simultaneously accomplished, but it can be performed after the separating lattice is located on the adjacent radiation barrier.

At lower temperatures, particularly when the warm temperature wall is below about 100K or so, as noted above, radiation heat transfer is very much diminished. In this instance, heat leak can be further reduced by installing the MLI insulation on the cold surface (using the above described variable density technique) and terminating with an outer reflective wrap which does not touch the warm surface. When the warmest reflector is thusly spaced away from the actual warm surface without an intervening separator or reflective layer, the space between the relatively warm wall and the radiation barrier closest to the relatively warm wall is substantially void of MLI and the above equation (5) is simply $k_s=0$ between the warm surface and the first reflector.

Figure 6:
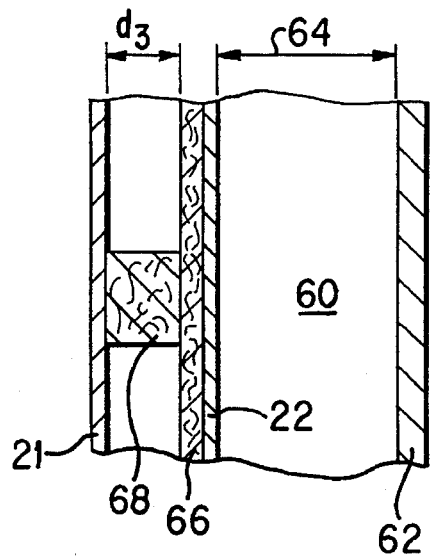
FIG. 6 is a schematic-sectional view of an alternate embodiment.

FIG. 6 illustrates an example of a situation where it is beneficial to install the outer reflective layer spaced from the warm surface. Therein, the evacuated chamber 60 of a helium Dewar includes a $LN_2$ shield 62 at 77.3K located inside the outer wall (not shown in FIG. 6.) Otherwise, the MLI corresponds to the inner layers of the FIG. 2 insulation where the reflective layer 22 is separated from the shield 62 (without touching it) by a space 64 which is about 2 to 3 times the width of the distance $d_3$ in FIGS. 2 and 6.

The reflective layer 22 is, in turn, separated from the next reflective layer 21 by an axially oriented separating layer 66 and a somewhat-thicker, circumferentially oriented separating layer 68 in the same manner as shown in FIG. 2. Particularly where the relatively "warm" surface 62 is at about 100K or lower, the just-described structure results in remarkably low heat transfer such as for a helium Dewar, for example. In fact, it is a tribute to the above-described variable-density MLI that it can improve on direct radiation from a 77.3K shield such as 62 to a cold wall (12 in FIG. 1) at helium (4.2K) or hydrogen (20.4K) temperatures.

As noted above, although best results are obtained by providing that each separating layer be determined by the results of a heat balance conducted at the location of that separating layer, in many cases, costs might be more important than performance so that groups of radiation barriers can be uniformly spaced, but the uniform-spacing for each group becomes larger as the cold wall is approached. This is suggested above in connection with a FIG. 2 embodiment where the spacing between the radiation barriers near the warm outer wall is essentially uniform because solid-conduction heat leak near the warm wall is far less significant than radiation heat leak. Similarly, a first group of a plurality of radiation barriers can be separated from each other by a substantially uniform first distance; a second group of a plurality of radiation barriers can be separated from each other by a substantially uniform second distance; and, so on, until an $n^{th}$ group of a plurality of radiation barriers are separated from each other by a substantially uniform distance n. In that case, the first distance is greater than the second distance and so on until a smaller substantially uniform distance n between radiation barriers is found for the $n^{th}$ group near the warm wall. In this embodiment, of course, the above set forth equations [(1), (2), etc.] can be employed, but each individual separator is not dimensioned in accordance with the heat balance conducted at its particular location. Instead, the layer-by-layer heat balances are used to determine the uniform thickness of each group of separators.

In one particular embodiment, assumed temperatures for individual reflectors are varied at each location until a desired heat transfer value is found for the overall system being calculated. A printout of these calculations will show the individual $K_r$, $K_g$, and $K_s$ values between each reflective layer; and, the thickness between layers can then be varied to improve performance. These thicknesses can then be iterated to decrease heat leak for a given system to a point where further iterations are no longer practical for a given cost situation. Ideally, this procedure is executed until a unique thickness of separating layer is determined between each reflector, but that approach is only practical for cryogenic equipment for use in space or other very critical applications where cost is less important than performance.

While the invention has been particularly shown and described with reference to preferred embodiments, thereof, it will be understood by those skilled in the art that various alterations in form and detail may be made therein without departing from the spirit and scope of the invention. It will be apparent, for example, that although the invention has been described in connection with a cryogenic storage vessel, its fundamentals are also applicable to high temperature uses. In any event, the above-described technique of providing separator thickness in accordance with a layer-by-layer heat balance provides an excellent structure for reducing overall heat transfer through MLI.

The embodiments of the invention in which an exclusive property or privilege is claimed are defined as follows:

1. A method of insulating a multi-layer insulation (MLI) structure which includes a relatively cold wall, a relatively warm wall, an evacuated space therebetween, a plurality of radiation barriers located in said evacuated space and a plurality of separators located between substantially all adjacent radiation barriers, said separators having a thickness to provide a distance between said radiation barriers, said method comprising the steps of:

conducting a heat balance at selected locations between said warm and said cold walls in said evacuated space to determine the portion of the overall thermal conductivity value ($k_t$) that is attributable at each said selected location to radiation ($k_r$) and solid conduction ($k_s$); and establishing the thickness of said separators at said selected locations and thusly the distance between said radiation barriers at said selected locations in accordance with the values of $k_t$ and $k_r$ at said selected locations, wherein said heat balance is conducted substantially in accordance with the equations:

$$k_t = k_r + k_g + k_s;$$

and, $$k_r = \sigma \left\{ \frac{[\epsilon_w \cdot \epsilon_c]}{\epsilon_w + \epsilon_c - \epsilon_w \cdot \epsilon_c} \cdot [T_w^2 + T_c^2] \cdot (T_w + T_c) - C \cdot [(T_w + T_c)/2]^3 \right\}$$

Where,
$\sigma$=Stephan-Boltzmann constant=5.675E(−8) W/m²·K⁴
$T_w$=temperature of the warm surface, K
$T_c$=temperature of the cold surface, K
$\epsilon_w$ & $\epsilon_c$ are the warm and cold surface emissivities C=a factor of the separated material and density $$k_g = C_1 \cdot P \cdot \alpha$$

Where,
$k_g$=gas conduction, W/m²·K
P=gas pressure, Pa
$\alpha$=accommodation coefficient
$C_1 = [(\gamma+1)/(\gamma-1)] \cdot [R/8\pi \cdot M \cdot T]^{1/2}$ and,
Where,
$\gamma = C_p/C_v$
R=gas constant, 8.31441 J/mol·K
M=molecular wt of gas, kg/mol
T=temperature of vacuum gauge, normally 300K;
and, $$k_s = C_2 \cdot f \cdot K / \Delta X$$

Where,
$k_s$=the solid conductivity per unit thickness, W/m²·K
$C_2$=an empirical constant
f=relative density of the separator compared to solid material
k=separator material thermal conductivity, W/m·K, and
$\Delta X$=actual thickness of separator between reflectors, m.

2. The method of claim 1, wherein said separators are comprised of glass paper and said $k_s$ value is determined substantially in accordance with the formula:

$$k_s = (0.002 \cdot f/\Delta X) \cdot [(0.03 + 0.00585 \cdot T - 0.0865 \cdot (T/100)^2)],$$

where K is the $(0.03 + 0.00585 \cdot T - 0.0865 \cdot (T/100)^2)$ value.

3. The method of claim 1, including the step of spacing the radiation barrier closest to said warm wall from said warm wall so that said radiation barrier closest to said warm wall does not touch said warm wall.

4. The method of claim 1, including the step of including a liquid-gas shield between said warm wall and the radiation barrier closest to said warm wall.

5. The method of claim 4 including the step of locating substantially all of said radiation barriers in a group between said warm wall and said shield and locating the radiation barrier in said group that is located closest to said shield so that it is spaced from said shield.

* * * * *